(12) United States Patent
Esposito

(10) Patent No.: US 11,114,846 B2
(45) Date of Patent: Sep. 7, 2021

(54) ELECTRONTIC BARRIER DEVICE FOR INTRINSICALLY SAFE SYSTEMS

(71) Applicant: Frederic Vladimir Esposito, Luton (GB)

(72) Inventor: Frederic Vladimir Esposito, Luton (GB)

(73) Assignee: Eaton Intelligent Power Limited, Dublin (IE)

( * ) Notice: Subject to any disclaimer, the term of this patent is extended or adjusted under 35 U.S.C. 154(b) by 151 days.

(21) Appl. No.: 16/079,424

(22) PCT Filed: Jan. 25, 2017

(86) PCT No.: PCT/GB2017/050189
§ 371 (c)(1),
(2) Date: Aug. 23, 2018

(87) PCT Pub. No.: WO2017/144847
PCT Pub. Date: Aug. 31, 2017

(65) Prior Publication Data
US 2019/0058326 A1     Feb. 21, 2019

(30) Foreign Application Priority Data
Feb. 24, 2016   (GB) .................................. 1603211.2

(51) Int. Cl.
*H02H 9/04*     (2006.01)
*H02H 9/00*     (2006.01)
*H02H 1/00*     (2006.01)

(52) U.S. Cl.
CPC .......... *H02H 9/042* (2013.01); *H02H 1/0007* (2013.01); *H02H 9/008* (2013.01); *H02H 9/041* (2013.01)

(58) Field of Classification Search
CPC ...... H02H 9/042; H02H 1/0007; H02H 9/008; H02H 9/041; H02H 3/023
See application file for complete search history.

(56) References Cited

U.S. PATENT DOCUMENTS

| | | | |
|---|---|---|---|
| 1,815,233 A | 7/1931 | Burke | |
| 3,594,612 A * | 7/1971 | Gately | H02H 3/202 361/55 |

(Continued)

FOREIGN PATENT DOCUMENTS

| | | |
|---|---|---|
| DE | 19829528 C1 | 2/2000 |
| EP | 3149550 B1 | 12/2018 |

(Continued)

OTHER PUBLICATIONS

International Search Report for PCT/GB2017/050189, dated May 4, 2017, 2 pages.

(Continued)

*Primary Examiner* — Yusef A Ahmed
(74) *Attorney, Agent, or Firm* — Stinson LLP

(57) ABSTRACT

An electronic barrier device includes an Isolating Barrier or a Zener Barrier with a voltage limiter or voltage shunt such as at least one zener device for voltage limitation in a circuit during a fault condition. The barrier device includes a crowbar device arranged to latch across the at least one voltage shunt device to reduce power dissipation in the at least one voltage shunt device in the circuit fault condition. The crowbar device is arranged to latch responsive to a change in a current flowing in the barrier device.

19 Claims, 5 Drawing Sheets

(56) References Cited

U.S. PATENT DOCUMENTS

| | | | | |
|---|---|---|---|---|
| 3,597,655 | A | * | 8/1971 | Forte ................ H02H 9/041 361/56 |
| 3,742,337 | A | * | 6/1973 | Digneffe ............ H02M 1/081 323/300 |
| 4,090,227 | A | * | 5/1978 | Schweitzer ......... H02H 3/023 361/100 |
| 4,099,216 | A | | 7/1978 | Weberg |
| 4,438,473 | A | * | 3/1984 | Cawley ............... G05F 1/569 361/101 |
| 4,618,906 | A | * | 10/1986 | Paice ................ H02H 3/023 361/5 |
| 5,017,756 | A | * | 5/1991 | Gilliland ............ B23K 9/1068 219/130.32 |
| 5,119,265 | A | * | 6/1992 | Qualich ............... H03K 17/08 323/907 |
| 5,144,517 | A | * | 9/1992 | Wieth ................ H02H 3/023 361/104 |
| 5,158,464 | A | | 10/1992 | Landrini |
| 5,564,086 | A | | 10/1996 | Cygan et al. |
| 5,694,283 | A | * | 12/1997 | Huczko ............... H02H 9/008 361/93.9 |
| 5,886,861 | A | * | 3/1999 | Parry ................ H02H 1/0015 361/115 |
| 6,157,529 | A | * | 12/2000 | Ahuja ................ H02H 3/025 361/103 |
| 6,331,763 | B1 | * | 12/2001 | Thomas ............... H02J 7/0029 320/136 |
| 6,340,878 | B1 | * | 1/2002 | Oglesbee ............ H02H 5/044 320/150 |
| 6,384,350 | B1 | | 5/2002 | Shincovich et al. |
| 6,608,470 | B1 | * | 8/2003 | Oglesbee ............ H02J 7/00 320/136 |
| 6,631,066 | B1 | * | 10/2003 | Smith ................ G05F 1/613 361/103 |
| 2002/0015273 | A1 | * | 2/2002 | Lytollis ............. H02H 9/008 361/93.9 |
| 2003/0076638 | A1 | * | 4/2003 | Simonelli ........... G05F 1/573 361/56 |
| 2005/0057277 | A1 | | 3/2005 | Chen et al. |
| 2006/0077612 | A1 | * | 4/2006 | Kothari ............... H02H 9/008 361/115 |
| 2007/0216351 | A1 | * | 9/2007 | Seki ................ H01M 10/44 320/112 |
| 2008/0041930 | A1 | | 2/2008 | Smith et al. |
| 2009/0021874 | A1 | * | 1/2009 | Divito ............... H02H 3/023 361/57 |
| 2009/0213509 | A1 | * | 8/2009 | Dooley ............... H02H 1/0015 361/57 |
| 2010/0117453 | A1 | | 5/2010 | Langgood et al. |
| 2010/0188785 | A1 | * | 7/2010 | Gascuel .............. H02H 3/033 361/18 |
| 2011/0056715 | A1 | * | 3/2011 | Vanko ............... H02P 3/22 173/176 |
| 2011/0058299 | A1 | * | 3/2011 | Simi ................ H02H 9/042 361/111 |
| 2011/0175699 | A1 | * | 7/2011 | Huss ................ H01H 85/32 337/143 |
| 2011/0188162 | A1 | * | 8/2011 | Wetter .............. H02H 9/041 361/57 |
| 2012/0007736 | A1 | | 1/2012 | Worthington et al. |
| 2012/0127619 | A1 | * | 5/2012 | Mikolajczak ......... H02H 3/023 361/79 |
| 2012/0250205 | A1 | * | 10/2012 | Pfitzer ............... H02H 9/041 361/91.1 |
| 2013/0155564 | A1 | * | 6/2013 | Schmidt ............. H02H 9/02 361/93.9 |
| 2015/0146332 | A1 | * | 5/2015 | Seberger ............ H02H 9/02 361/57 |
| 2015/0229121 | A1 | * | 8/2015 | Davidson ............ H02H 3/087 361/54 |
| 2015/0296598 | A1 | | 10/2015 | Haid et al. |
| 2016/0226162 | A1 | | 8/2016 | Emi |
| 2016/0241023 | A1 | * | 8/2016 | Bentley ............. H02H 9/025 |
| 2016/0372917 | A1 | * | 12/2016 | Lowers .............. H02H 9/008 |
| 2017/0122988 | A1 | * | 5/2017 | Kothekar ............ H02H 3/046 |
| 2017/0285713 | A1 | * | 10/2017 | Bezawada ........... H02M 3/04 |
| 2018/0309285 | A1 | * | 10/2018 | Jacobson ............ H02H 9/02 |

FOREIGN PATENT DOCUMENTS

| | | |
|---|---|---|
| WO | 99/21332 A1 | 4/1999 |
| WO | 2004010083 A2 | 1/2008 |
| WO | 2014147093 A1 | 9/2014 |
| WO | 2015/066007 A1 | 5/2015 |

OTHER PUBLICATIONS

Paul S. Babiarz, Making Start with the Field Device, Jan. 1, 2005, 20 pages.

Eaton, Surge Protective Devices Introduction, 4 pages, Nov. 1, 2012.

Eaton, Surge Protection Solutions for High Energy Surges and Transient Disturbances Capabilities Overview, 8 pages, Aug. 31, 2016.

* cited by examiner

ELECTRONIC BARRIER DEVICE FOR INTRINSICALLY SAFE SYSTEMS

CROSS-REFERENCE TO RELATED APPLICATIONS

This application is a National Stage Entry of, and claims priority to, PCT Patent Application No. PCT/GB2017/050189, filed Jan. 25, 2017, which claims priority to United Kingdom Patent Application No. GB1603211.2, filed Feb. 24, 2016, both of which are hereby incorporated by reference in their entirety.

FIELD

The present invention relates to a voltage shunt device such as also known as a voltage crowbar and, in particular, but not exclusively, to a voltage shunt device for use in power-dissipation reduction in a barrier device for intrinsically safe systems and such as found in isolating barriers or zener barriers.

BACKGROUND

Barrier devices commonly comprise voltage limiters, such as a zener group providing voltage-limitation, a fuse serving to limit the current in the Zener, and limit resistors on an output leg of the device serving to limit the output current arising at the defined zener clamping voltage. Zeners, and resistors must be used at no more than $\frac{2}{3}^{rd}$ of their maximum rating, and the fuse must be considered to remain intact with a sustained current at 1.7 times its rating.

However, such an arrangement can prove problematic since the power consumption in the zeners in fault condition, i.e. when the zeners are clamping the voltage, can become considerable and the heat generated can prove difficult to dissipate, particularly in a small enclosure typical of an isolating barrier or a zener barrier device.

For example, and noting the above rating characteristics, for a sustained current of 70 mA, a 100 mA fuse would be required. If the output voltage is to be 20V max, 20V zeners would be necessary. This arrangement will generate (0.1 A×1.7)×20V=3.4 W of heat to dissipate in fault condition and so will require a rating of 5.1 W continuous for the zener. Dissipating such power and providing a suitable zener might be impossible. To alleviate such a problem of power dissipation, a known solution is to use a so-called voltage crowbar device. Such devices operate to detect the voltage at the zener before it reaches the zener minimum voltage (according to the zener tolerances) and if that voltage exceeds the limit, a latching short circuit is fired across the zener. As an example, such a short circuit could provide 1V across the crowbar and with a current of 100 mA×1.7, the dissipated power in the crowbar device will then only be 0.17 W—as compared with the 3.4 W that had previously arisen in the Zener(s).

DETAILED DESCRIPTION

Figure 1:
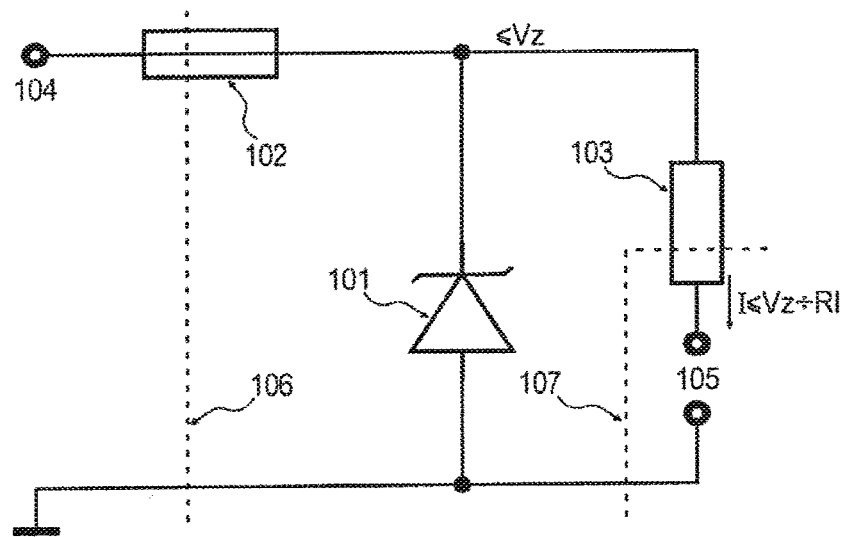
FIG. 1 is a circuit diagram of a barrier device of the prior art.

For further illustration of the current art, and turning to FIG. 1, there is provided a diagram of a basic barrier device in which an undefined voltage with undefined current capability is present at an input 104 such that some, or all, of its power is available on an output 105. The voltage is subjected to zener clamping 101 at the Zener voltage Vz, to guarantee a maximum value of ≤Vz. This now protected voltage, while passing current through a limit resistor 103 restricts the maximum current available on the output 105 to ≤Vz÷RI.

As noted above, such values should remain valid at the following conditions: all components must be ⅔ rated in their power parameters. Therefore to protect the zeners from this rule being breached, a series fuse 102 serves to limit the continuous current to 1.7 times the nominal fuse value (that factor is deemed to be a safe one and is used as norm). For practical reasons the fuse rating must be at least the same as the output short circuit current, and preferably exceed it by a safety factor, for long term reliability.

This means that, if a zener sees a continuous power of maximum ⅔ of the maximal allowed continuous power as specified in the datasheet, it can only fail in reduced value (short circuit included), never in increased value (open circuit included).

Also, if a resistor sees a continuous power of maximum ⅔ of the maximal allowed continuous power as specified in the datasheet, it can only fail in increased value (open circuit included), never in reduced value (short circuit included).

Further, both component types must also be able to withstand 1.5 times the possible transients as per their datasheet.

Still further, temperature de-rating will have to be applied, and segregation distances will be a safety requirement.

Finally, the distance in the barrier, from an input boundary 106 to an output boundary 107, could be part of a zener barrier or part of a more complex apparatus, an isolating barrier for example, and such that an intrinsically safe signal can be available after the output boundary.

If choice of zener was limited to practical zener device for the applications, and since, most power zeners are either limited to 3 W continuous for surface mounted types, or 5 W continuous for the leaded components, the maximum allowed continuous power dissipated would then be limited respectively to 2 W and 3.3 W.

However, in a fault condition, the continuous power requiring dissipation can be well over these values.

Even if the limiting elements could withstand such power, the enclosure may not be able to dissipate the generated heat.

A known solution to this is to let the zeners absorb transients but when the continuous power is experienced above their rating, a shunt element triggers and shorts the zeners, in turn blowing the safety fuse. This then has the effect of annihilating unsafe power.

The shunt element is of the latching type and must remain on until the power is removed (mostly when the fuse is blown).

Additionally the shunt must be triplicated and infallibly constructed since for is and ib type circuits, two countable faults could still occur.

In fault conditions, when the voltage's value approaches the zener's minimum clamping voltage, if a shunt or short circuit is applied across the zeners, the only power dissipated before the fuse is blown is the input current in this situation times the shunt voltage drop, resulting in lower power that would be otherwise dissipated in the zeners.

Further details of such a known crowbar arrangement are illustrated in FIG. 2, where, again an undefined voltage with undefined current capability is present at an input 204 and some or all of its power is available on an output 205. The voltage is again subjected to zener clamping 201 to guarantee a maximum value≤Vz. This now protected voltage, while passing current through a limit resistor 203 restricts the maximum current available on the output 205 to ≤Vz÷RI.

However, and according to the crowbar functionality, the input voltage is compared to a reference voltage 230 by a comparing element 231.

If the input voltage is higher than a predetermined safe value, the comparing element will close the shunt element 220. This shunt element is of the latching type and will remain closed until its current is removed.

The maximum power is now only (1.7×the fuse rated current)×(closed shunt voltage).

Figure 3:
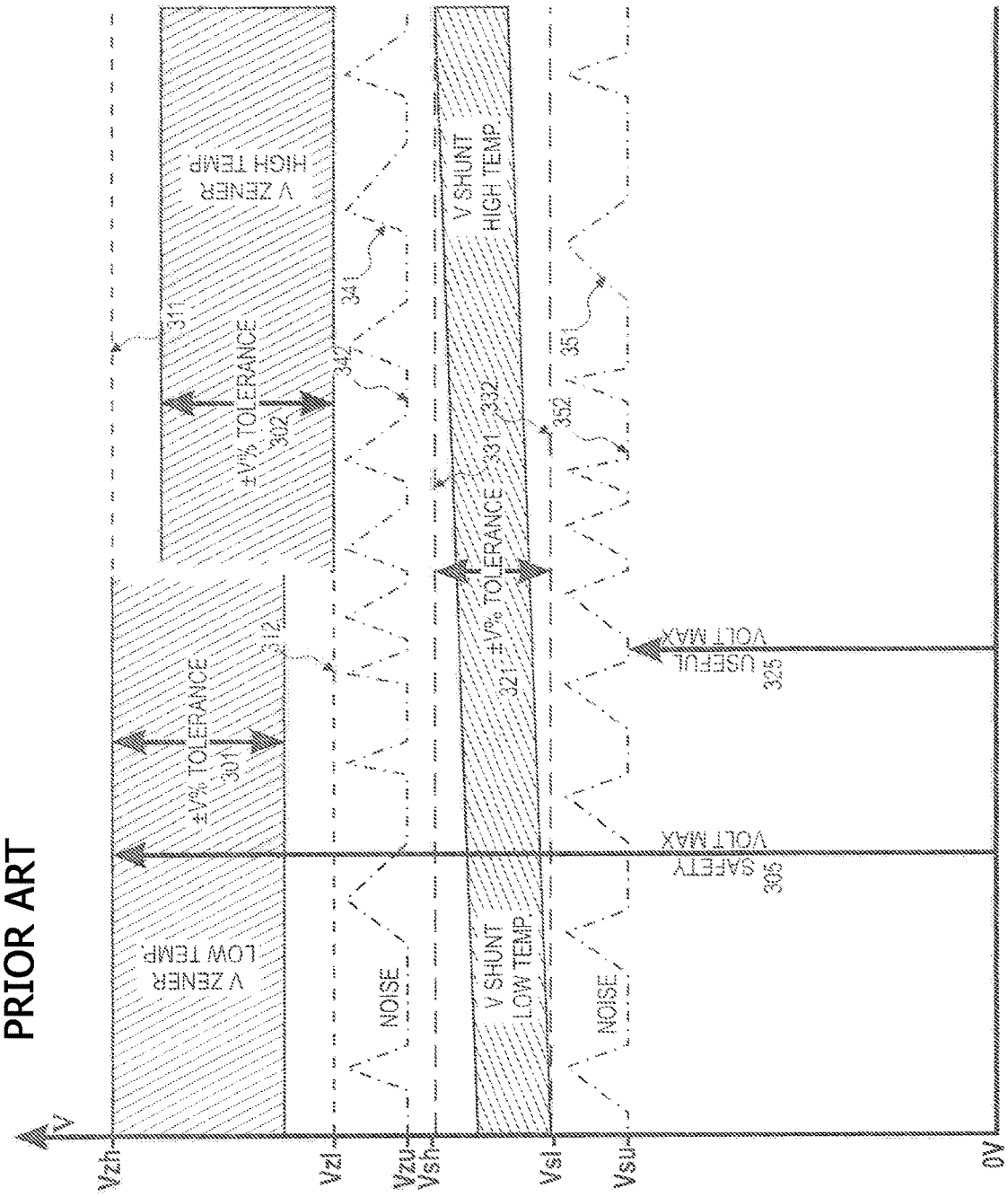
FIG. 3 is a graph of operating ranges of the circuit in FIG. 2.

Reference is now made to FIG. 3 which illustrates the operating ranges associated with such a shunt.

The zeners have a nominal voltage tolerance 301 302. Additionally the nominal zener value decreases with the temperature. This gives Vzh, the maximum zener voltage 311 and Vzl, the minimum zener voltage 312. Vzh is the safety voltage 305 used to describe the intrinsically safe output 205.

The incoming voltage will be subject to noise 341. Practically, without the shunt, the noise range must be situated underneath the zeners to prevent them conducting repetitively. The useful voltage will be Vzu, the minimum noise level 342.

The shunt circuitry has also an operating tolerance range 321. Typically such a shunt system will have a positive temperature coefficient. This gives Vsh, the maximum shunt trigger voltage 331 and Vsl, the minimum shunt trigger voltage 332.

As the shunt must operate before any zener takes over, Vsh must be lower than Vzu with a small safety margin.

The shunt is a latching circuit and should not be triggered on any incoming noise. The incoming voltage will be subject to noise 351. Practically, the noise range must be situated well underneath the shunt minimum trigger point Vsl to prevent it to blow the fuse. The useful voltage will be Vsu, the minimum noise level 352.

Examples of element values are:
Fuse 202: 1 A
Zener value 201: 10V total
Zener tolerance 301, 302: ±5% (full temperature)
Limit resistor 203: 20Ω
Voltage noise levels 341, 351: 1V
Shunt trigger point tolerance 321: 0.4V
Shunt on voltage drop: 1V
Vzh=10V+5%=10.5V Vzl=10V−5%=9.5V
With a safety margin of 0.5V: Vzu=9.5V−0.5V−1V=8.0V
With a safety margin of 0.5V: Vsh=8.0V−0.5V=7.5V
Vsl=7.5V−0.4V=7.1V
With a safety margin of 0.5V: Vsu=7.1V−1V=6.1V
The safety voltage max 305 is Vzh=10.5V
The useful voltage max 325 is Vsu=6.1V (58% of Vzh)
Maximum zener power (no shunt): Pz=(10V+5%)×(1 A×1.7)=17.8 W
Maximum shunt-on power: Ps=1V×(1 A×1.7)=1.7 W As can therefore be seen with reference to the above exemplary values, a great part of the maximum voltage available cannot be used as it is suppressed to ensure a smooth operation of the product. There is a great distance between the maximum declared safe voltage and the practical voltage available.

Additionally, this proves particularly disadvantageous since, with the circuit being triplicated, the use of an expensive reference can lead to a threefold increase in cost.

If a fault develops, which takes any substantial current, the voltage after the fuse is likely to drop. This means that the trigger circuit is less likely to activate. In consequence every shunt element must be able to take the full power available with a 1.7 times the nominal fuse current. While available zeners might not be dimensioned for that, a shunt element could be.

Also, if in one chain of zeners, one fails short or low value, the remaining zeners may clamp at a lower voltage that the shunt trigger voltage.

Thus, the operation of known crowbar devices can prove problematic and limited since, as the output voltage is desired to be as high as possible, and the clamping voltage as low as possible, specifically selected zeners are required which can increase costs threefold. Also, accurate and stable references must be employed within the voltage crowbar detection circuits, ideally in duplicate or triplicate, which has further cost implications. Therefore such known voltage-based crowbars are costly and can prove overly sensitive as they are configured just near the tolerances limits The present invention therefore seeks to provide for a voltage crowbar device having advantages over known such voltage crowbar devices.

According to one aspect of the present invention, there is provided an electronic barrier comprising a voltage limiter, for example employing zener diodes for voltage limitation in a circuit during a fault condition, the barrier device including a crowbar device arranged to latch across the voltage limiter to reduce power dissipation in the voltage limiter in the circuit fault condition, wherein the crowbar device is arranged to latch responsive to a current sensed in the barrier device.

The invention is advantageous in that by sensing the current in the line, instead of sensing the voltage, the operation of the crowbar is independent of voltage limiter tolerances. Also, current sensing benefits from a wide range of current available within the circuit, which is well beyond the required current, as so the tolerances arising in current sensing are inherently greater than with voltage sensing As an example, the voltage limiter can comprise at least one zener device.

On this basis, the crowbar functionality of the present invention can be implemented with normal tolerance components and can further exhibit reduced sensitivity. Sensitivity can also further be improved since, while a voltage spike could occur easily before reaching the zener overclamping voltage, a current spike cannot occur because the maximum voltage is Zener-defined and therefore the maximum current through for example the serial resistors is limited by that voltage.

Preferably, the barrier device includes a fuse and/or limiting resistor. In such an arrangement, the sensed current can comprise that passing through the fuse.

Also, the device can advantageously comprise an intrinsic safety barrier.

Yet further, the crowbar device is arranged, when latched across the zener device, to remove all power dissipation within the zener device. In particular, the current is diverted through the crowbar, and with a residual voltage of around 1V or less across the crowbar, there can be greatly reduced power dissipation.

According to another aspect of the present invention is provided a crowbar device arranged to latch across a voltage limiter, such as at least one zener, of a barrier device, to reduce power dissipation in the voltage limiter, wherein the crowbar device is arranged to latch responsive to a sensed current in the barrier device.

According to yet another aspect of the present invention, there is provided a method of reducing power dissipation in a voltage limiter, such as at least one zener, of a barrier device, including the step of latching a crowbar device across the voltage limiter to reduce power dissipation in the voltage limiter, and wherein the step of latching the crowbar device occurs responsive to the sensing of a current in the barrier device.

Figure 4:
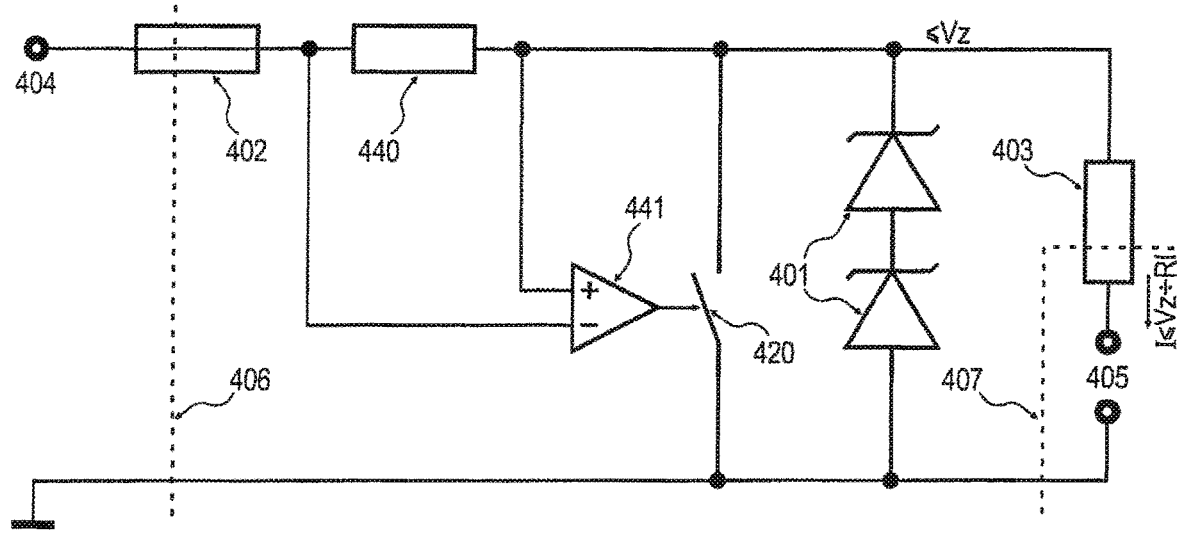
FIG. 4 is a circuit diagram of a barrier device of the present disclosure.
Figure 5:
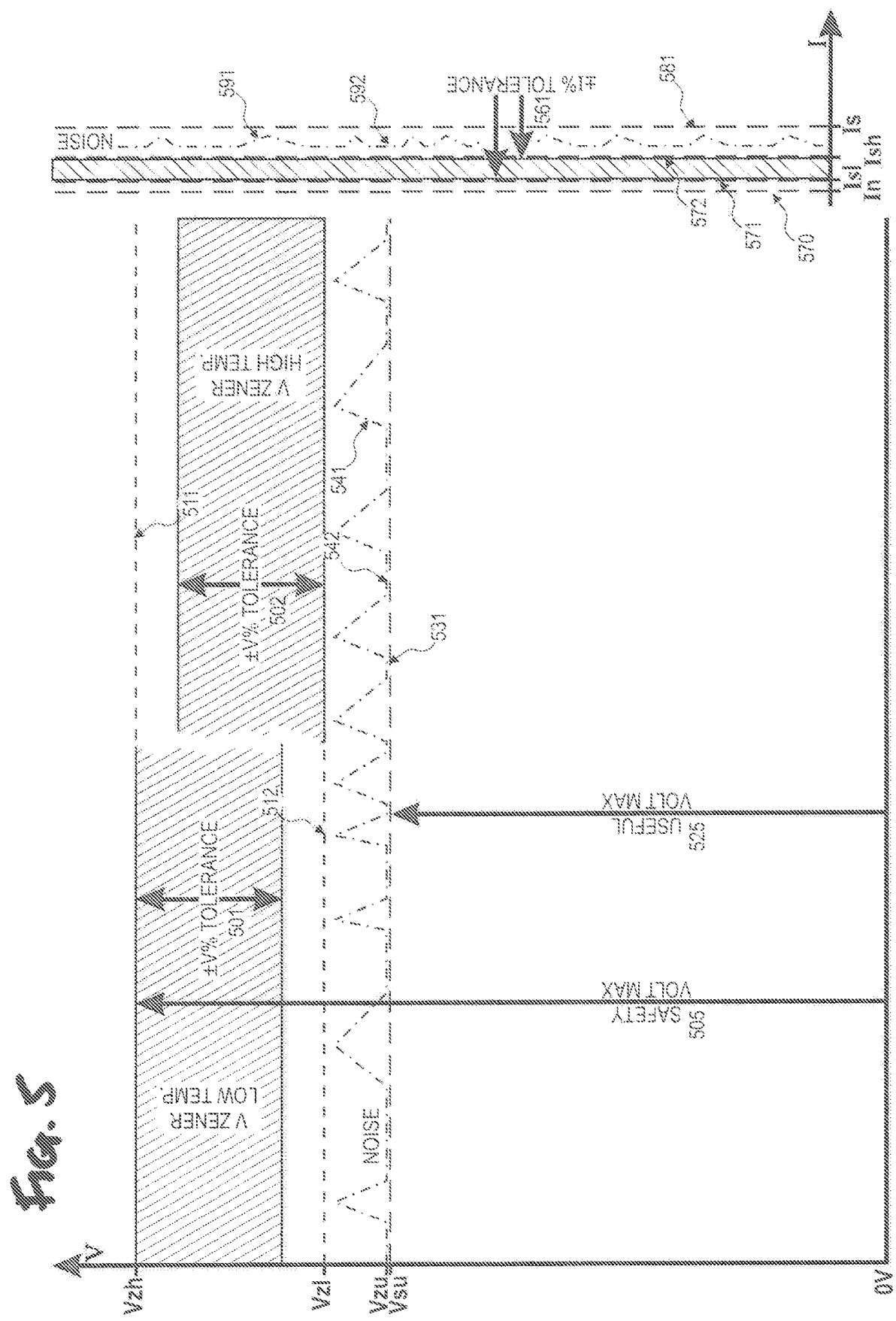
FIG. 5 is a graph of operating ranges of the circuit in FIG. 4.

The invention is described further hereinafter, by way of example only, with reference to the accompanying drawings in which:

FIG. 4 the circuit diagram of a barrier device employing a voltage crowbar device according to an embodiment of the present mention; and FIG. 5 is a voltage diagram illustrating the operational tolerances of a voltage crowbar device such as that illustrated in FIG. 4.

As will therefore be appreciated, the invention involves triggering the shunt on a sensed current rather than an input voltage.

Figure 2:
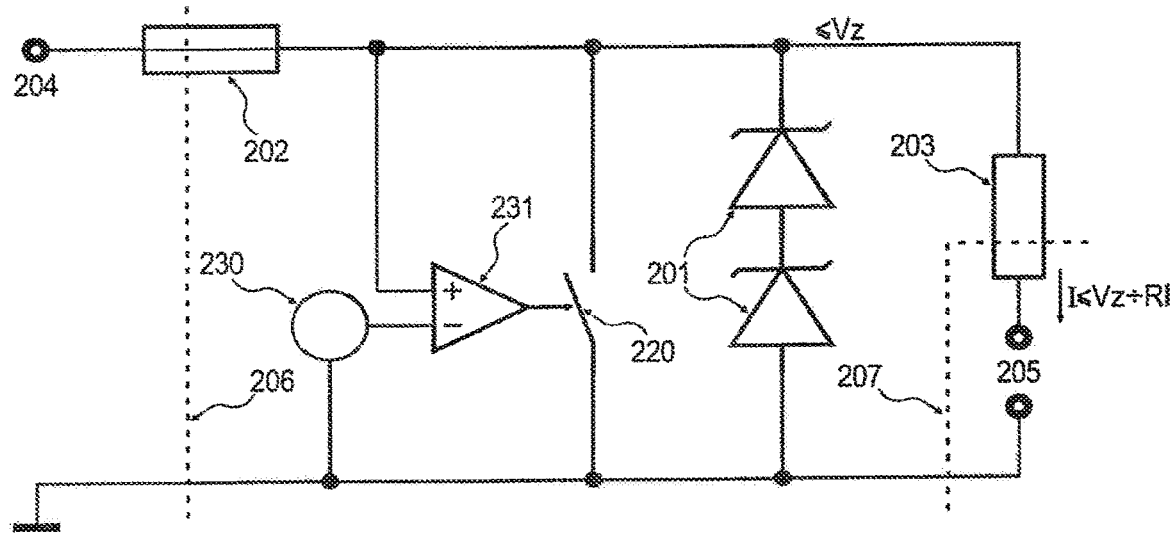
FIG. 2 is a circuit diagram of another barrier device of the prior art.

Turning to FIG. 4, which for ease of comparison has a similar configuration as the prior art arrangement of FIG. 2, an undefined voltage with undefined current capability is present at an input 404 and some or all of its power is available on an output 405. The voltage is subjected to voltage limiting which, in this illustrated example, comprises zener clamping 401 to guarantee a maximum value ≤Vz. This now protected voltage, while passing current through a limit resistor 403 restricts the maximum current available on the output 405 to ≤Vz÷RI.

In addition, the input current is sensed through a resistor 440 and evaluated by a comparison element 441. If the input current is higher than a safe value, the comparison element will close the shunt element 420. This shunt element is advantageously of the latching type and will remain closed until its current is removed. Additionally, because of the circuit, closing the shunt consequently increases the current through the sense element 440 and it is therefore self-latching.

The maximum power dissipated is now across the shunt and is now only (1.7×the fuse rated current)×(closed shunt voltage). The power has thus been reduced, not by sensing the voltage, but rather by sensing the current. That is, the both power has been reduced and also the trigger for activation of the crowbar is different.

Normally the user is not operating the output in short-circuit but in some useful mode, which will be well below the maximum current available through the fuse. This means that the current clamp can advantageously operate at a much lower value than the nominal fuse value×1.7.

Examples of practical operating ranges of such a shunt are illustrated in FIG. 5.

That is, the zeners have a voltage tolerance 501, 502. Additionally the nominal zener value decreases with the temperature giving Vzh, the maximum zener voltage 511 and Vzl, the minimum zener voltage 512. Vzh is the safety voltage 505 used to describe the intrinsically safe output 405.

The incoming voltage will be subject to noise 541. Practically, the noise range must be situated underneath the zeners to prevent them conducting repetitively. The useful voltage will be Vzu, the minimum noise level 542.

Since the shunt circuitry is not operating in the voltage range, this means that the useful voltage Vsu is the minimum noise level 542.

Practically it is desired to operate the output up to In, the maximum operating current 570. In current mode, the noise level is much lower than in voltage mode. Allowing for a small current noise 591, and the small tolerances 561 on the current trigger, this permit to place Isl, the minimum current trigger level 571 very near the noise. One can set Is, the nominal current trigger level 581 just after Ish, the maximum current trigger level 572.

The following are examples of possible values for illustrative purposes, when possible using the same values as our previous example, for comparison:

Fuse 402: 1 A
Zeners value 401: 10V total
Zener tolerance 501, 502: ±5% (full temperature)
Limit resistor 403: 20Ω
Voltage noise level 541: 1V
Current noise level 541: 0.1V
Shunt trigger point tolerance 521: ±2%
Vzh=10V+5%=10.5V Vzl=10V−5%=9.5V
With a safety margin of 0.5V: Vzu=Vsu=9.5V−0.5V−1V=8.0V
The safety voltage max 505 is Vzh=10.5V
The useful voltage max 542 is Vsu=8.0V (76% of Vzh)
Maximum zener power (no shunt): Pz=(10V+5%)×(1 A×1.7)=17.8 W
Maximum shunt-on power: Ps=1V×(1 A×1.7)=1.7 W
Maximum current available: In=10.5V÷20Ω=0.53 A
With a safety margin of 0.1 A and the current noise:
Isl=0.53 A+0.1 A+0.1 A=0.73 A Ish=0.73 A+4%=0.76 A
With a safety margin of 0.1 A: Is=0.76 A+0.1 A=0.86 A
We can see in this example that the useful voltage available has increased from
58% to 76%, a substantial gain.

Various advantages arise from the use of an over-current triggered shunt as compared with the present art. In particular, more voltage is available at the output of the barrier device. Also, there is less distance between the maximum declared safe voltage and the practical voltage available Operating with reference to an input current value, and because the maximum current is defined by a short on the limit resistor, it is easy to place the trigger level just outside that input current. As the circuit must be triplicated, and there is no need for a reference, the overall cost is not severely impacted by such requirement for triplication.

Also, if a fault develops, which takes any substantial current, the current after the fuse is likely to increase. This means that the trigger circuit will activate. In consequence every shunt element must not be required to take the full power available with a 1.7 times the nominal fuse current. If, in one chain of zeners, one fails with a short, or low value, the current will increase to the shunt trigger value and therefore will automatically be safe.

By setting the shunt trigger current very near the practical maximum output current, it will be very near the fuse rating or lower without being affected by the factor 1.7.

Various potential fail-scenarios are outlined below, with discussion of the respective reactions of a voltage sensed shunt as in the current art, and a current sensed shunt according to an embodiment of the invention.

First, it is envisaged that one zener might fails, either with a lower value or short. Then, for a voltage sensed shunt, the shunt may never trigger as the voltage is likely to decrease, and also any other zener(s) will see the full power available. However, with a current sensed shunt, it remains fail-safe since the shunt will trigger early as the current will rise.

Next it is envisaged that one shunt element fails, it can fail in any mode. If it fails open, a voltage sensed shunt will remain fail safe since the shunt is triplicated. In a similar way, for a current sensed shunt, fail safe operation will be retained as again the shunt is triplicated If one shunt element fails, it can fail in any mode. If it fails resistive or short then for a voltage sensed shunt, the element may have to take all of the available power. The triplication will not help as the voltage is likely to decrease, therefore no trigger action is guaranteed. However, for a current sensed shunt, it will remain fail safe and, as the element will take more current, the rest of the triplicated shunt can or will trigger.

Further, if one comparison element fails, it can fail in any mode and with a voltage sensed shunt, it will be in fail safe mode as the shunt is triplicated, or else it will be triggered. For a current sensed shunt, again, it will remain in fail safe mode as the shunt is triplicated, or it will be triggered.

If one reference fails, it can fail in any mode and, as above, the voltage shunt will be in fail safe mode and as the shunt is triplicated or it will be triggered. As there is no reference, in such a fail mode a current sensed shunt is not applicable.

As a final example, if the sense resistor fails, it can fail with a higher value or open and in such case a voltage sensed shunt will not be applicable. However, a current sensed shunt will be in fail safe and the shunt will trigger early as the current will be sensed at a higher level.

It should of course be appreciated that the invention is not restricted to the details of the foregoing embodiments. For example, the invention need not be embodied solely in a zener barrier device per se, but can also related to associated apparatus using a barrier arrangement as a possibly integral part of the circuitry, such as for example isolating barrier devices.

Further, the crowbar could additionally be arranged to reduce power in other components of the barrier, such as for example the limit resistor.

The invention claimed is:

1. An electronic barrier device comprising:
   an input;
   a voltage limiter device for voltage limitation in a circuit during a circuit fault condition,
   a crowbar device arranged to latch across the voltage limiter device to reduce power dissipation in the voltage limiter device in the circuit fault condition,
   a current sensor connected between the input and the crowbar device such that the current sensor is disposed upstream from the crowbar device, the current sensor sensing current at the input, and
   a fuse disposed between the input and the current sensor such that the sensed current comprises a current through the fuse, the current sensor being disposed between the fuse and the crowbar device,
   wherein the crowbar device is arranged to automatically latch responsive to a change in the current sensed by the current sensor thereby increasing the current through the current sensor in the circuit fault condition, the electronic barrier device being configured for use in intrinsically safe systems.

2. The electronic barrier device of claim 1, further including an output line and a limiting resistor in the output line.

3. The electronic barrier device of claim 1, further comprising an intrinsic safety barrier.

4. The electronic barrier device of claim 1, wherein the crowbar device is arranged, when latched across the voltage limiter device, to remove all but negligible power dissipation within the voltage limiter device.

5. The electronic barrier device of claim 4, wherein the crowbar device is arranged such that almost all of the power dissipation during the circuit fault condition occurs across the crowbar device.

6. The electronic barrier device of claim 1, wherein the voltage limiter device comprises at least one zener device.

7. The electronic barrier device of claim 1, wherein the crowbar device is arranged to reduce power dissipation in at least one other limiter device within the barrier device.

8. The electronic barrier device of claim 7, wherein one of the at least one other limiter device that the crowbar device is arranged to reduce power dissipation in is a limit resistor.

9. The electronic barrier device of claim 1, wherein over 60% of a maximum safety voltage is available as useful voltage at an output of the electronic barrier device.

10. A crowbar device arranged to latch across a voltage limiter device of a barrier device to reduce power dissipation in the voltage limiter device,
    wherein the crowbar device is arranged downstream from a current sensor to automatically latch responsive to a change in a current sensed by the current sensor thereby increasing the current through the current sensor in a circuit fault condition, the current sensor being connected between an input of the barrier device and the crowbar device, and a fuse of the barrier device being disposed between the input and the current sensor such that the sensed current comprises a current through the fuse, the current sensor being disposed between the fuse and the crowbar device, the crowbar device being configured for use in the barrier device, and the barrier device being configured for use in intrinsically safe systems.

11. The crowbar device of claim 10, wherein the crowbar device is arranged, when latched across the voltage limiter device, to stop power dissipation in the voltage limiter device.

12. The crowbar device of claim 10, wherein the crowbar device is arranged to reduce power dissipation in at least one other limiter device within the barrier device.

13. The crowbar barrier device of claim 12, wherein one of the at least one other limiter device that the crowbar device is arranged to reduce power dissipation in is a limit resistor.

14. A method of reducing power dissipation in a voltage-limiter of a barrier device during a circuit fault condition, including the step of:
    sensing a change in current in the barrier device flowing across a current sensor, and
    automatically latching a crowbar device, disposed downstream from the current sensor, across the voltage limiter to reduce the power dissipation in response to the sensing of the change in current across the current sensor thereby increasing the current through the current sensor in the circuit fault condition, the current sensor being connected between an input of the barrier device and the crowbar device, and
    wherein the step of sensing the change in current includes sensing the change in current through a fuse device of the barrier device, the fuse device being disposed between the input and the current sensor, and the current sensor being disposed between the fuse device and the crowbar device.

15. The method of claim 14, wherein the crowbar device, when latched across the voltage limiter device, removes all but negligible power dissipation within the voltage limiter device.

16. The method of claim 15, wherein almost all of the power dissipation in the barrier device during the circuit fault condition occurs across the crowbar device.

17. The method of claim 14, wherein the voltage limiter device comprises at least one zener device.

18. The method of claim 14, wherein latching the crowbar device across the voltage limiter to reduce the power dissipation in the voltage limiter simultaneously reduces the power dissipation in at least one other limiter device within the barrier device.

19. The method of claim 14, wherein one of the at least one other limiter device that the crowbar device reduces power dissipation in is a limit resistor.

\* \* \* \* \*